Aug. 4, 1964  A. WINKLER ETAL  3,143,050
FILM MAGAZINE FOR CAMERAS
Filed April 19, 1962  3 Sheets-Sheet 2

INVENTOR.
ALFRED WINKLER
WILFRIED HOFMANN
BY
Michael J. Striker

Aug. 4, 1964  A. WINKLER ETAL  3,143,050
FILM MAGAZINE FOR CAMERAS
Filed April 19, 1962  3 Sheets-Sheet 3

INVENTOR.
ALFRED WINKLER
WILFRIED HOFMANN
BY
Richard S. Striker
Attorney

United States Patent Office

3,143,050
Patented Aug. 4, 1964

3,143,050
FILM MAGAZINE FOR CAMERAS
Alfred Winkler and Wilfried Hofmann, Munich, Germany, assignors to Agfa Aktiengesellschaft, Munich, Germany
Filed Apr. 19, 1962, Ser. No. 188,764
Claims priority, application Germany Apr. 28, 1961
5 Claims. (Cl. 95—31)

The present invention relates to cameras and in particular to film magazines for cameras.

Certain cameras are required to take a large number of photographs in a relatively short period of time, such as cameras used in commercial establishments for identification of people or cameras used in checking on traffic on the roads, and with cameras of this type there is generally a film magazine which is required to be easily placed into and removed from the camera so as to change the particular type of film which is being used. However, when the film in the magazine is exposed and it is required to change this film then the magazine itself generally remains attached to the camera and instead the exposed film which is located in a cassette within the magazine is sent away to be developed and a fresh supply of unexposed film is introduced into the magazine.

Inasmuch as these latter operations must be performed in a darkroom, so as not to undesirably expose the fresh film which is to be placed in the magazine, it does not infrequently happen that errors occur in the preparation of the camera for exposing a fresh roll of film. For example, the supply and take-up cassettes which are placed into a magazine of the above type can be easily confused one for the other in the darkroom and where the supply cassette should be in the magazine the take-up cassette will inadvertently be placed, and vice versa, and in addition, it is often possible to connect one or both of the cassettes to the magazine in an improper position.

It is accordingly a primary object of the present invention to provide a film magazine of the above type with supply and take-up cassettes which cannot be confused with each other even in a darkroom.

Another object of the present invention is to provide a film magazine of the above type with a construction which compels the cassettes to be connected only in predetermined positions with respect to the magazine or otherwise they cannot be connected thereto and in such a way that the cassettes cannot interchangeably be connected with the magazine, so that not only does each cassette have a predetermined position with respect to the magazine, but in addition it is not possible to locate the supply cassette in the position of the take-up cassette or the take-up cassette in the position of the supply cassette.

It is furthermore an object of the present invention to provide a structure of the above type which will reliably protect the film against premature and inadvertent exposure to light.

An additional object of the present invention is to provide for a magazine of the above type cassette constructions which compel the operator to place unexposed film in the proper cassette and to arrange the take-up cassette for receiving exposed film, without any possibility of placing unexposed film in the take-up cassette.

Still another object of the present invention is to provide a film magazine construction of the above type in which, while it is impossible to confuse the two cassettes in the darkroom or to connect them improperly to the magazine, nevertheless the identical operations are performed in order to open both of the cassettes and simultaneously close or lock the magazine so that the operator need only perform one type of operation on both cassettes in order to prepare the film for exposure in the camera and thus is not required to remember to provide one type of operation for one of the cassettes and another type of operation for the other cassette.

The object of the present invention also includes a cassette construction which reliably prevents the components of the cassette from shifting undesirably with respect to each other while the operator is connecting the cassette to the housing of the magazine.

With the above objects in view, the invention includes, in a film magazine for a camera, a magazine housing and a pair of cassettes adapted to be located therein, one of the cassettes being a supply cassette for supplying unexposed film and the other of the cassettes being a take-up cassette for receiving the exposed film, and said cassettes respectively having at least at their exteriors different constructions so that they can be identified and distinguished from each other in the dark.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
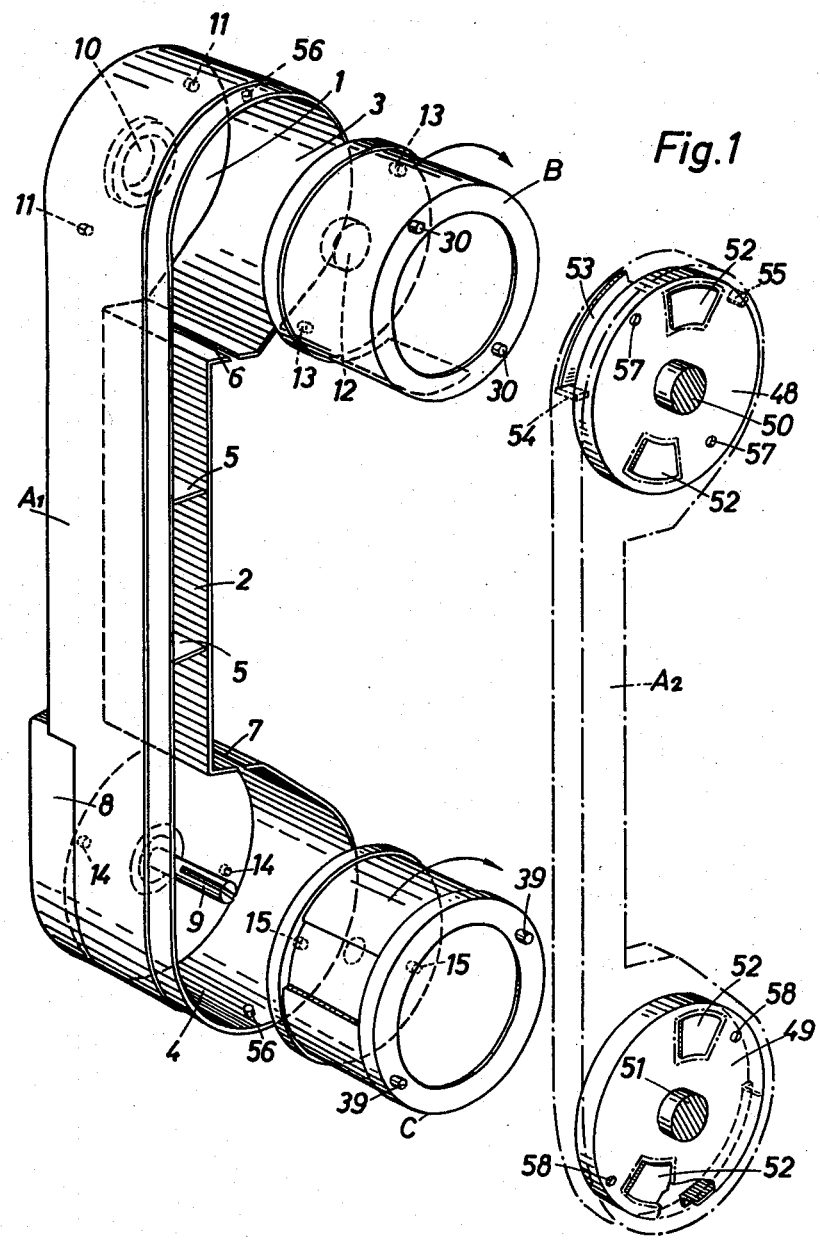
FIG. 1 is an exploded, perspective, partly diagrammatic illustration of a film magazine according to the present invention, FIG. 1 also showing fragmentarily and diagrammatically structure for driving a take-up spool.

Referring to FIG. 1, there is shown therein the magazine housing $A_1$ for a camera which is adapted to make a large number of photographs in a short period of time, as referred to above. The cover $A_2$ of the magazine housing $A_1$ is shown in dot-dash lines in FIG. 1 so as to clearly illustrate structure carried by the cover $A_2$ and described below. Also shown in FIG. 1 are a supply cassette B which contains a supply of unexposed film and a take-up cassette C into which the exposed film is wound.

The magazine housing $A_1$ includes a bottom wall 1 and an endless side wall 2, these walls defining a chamber 3 for receiving the supply cassette and a chamber 4 for receiving the take-up cassette. Between the chambers 3 and 4 the housing carries stiffening ribs 5 as shown in FIG. 1. The chamber 3 communicates with a slit 6 formed in the side wall 2 and through which film issues from the supply cassette B in order to be exposed, and also the wall 2 is formed with a slit 7 through which the film enters into the chamber 4 to be received in the take-up cassette C therein. A pressure plate for the film and structure for maintaining the slits 6 and 7 light-tight while the film passes therethrough are purely conventional and are therefore not illustrated. At the lower left-hand portion of FIG. 1 is shown the housing 8 of a drive which serves to rotate the shaft 9 which extends into the chamber 4 for driving a take-up spool of the take-up cassette in order to wind the exposed film thereon, the magazine when it is placed in the camera having the illustrated position with respect to the housing 8 so as to receive therefrom the drive for advancing the film.

The bottom wall 1 of the magazine housing $A_1$ is formed in the chamber 3 with a central relatively large opening 10 as well as with a pair of depressions 11, and the supply cassette B is provided at its face which is located next to the face of the bottom wall 1 in the chamber 3 when the cassette B is located in the magazine housing with a pin 12 which is received in the opening 10 and with a pair of pins 13 which are respectively received in the depressions 11, so that in this way the cassette is maintained against turning in the magazine housing. It will be noted that the supply cassette B is substantially cylindrical in configuration and it has a central axis coinciding with the axis of the cylindrical projection 12 which is received in the circular opening 10. Radial lines drawn from the central axis of the cassette B on its face which is directed toward the bottom wall 1 of the magazine housing and passing through the axes of the pins 13, and of course the same applies for radial lines extending from the axis of the depression 10 in the plane of the bottom wall 1 through the axes of the depressions 11, make with each other an angle which is on the order of 160°. Since this latter angle is not 180°, the cassette B can be connected to the housing $A_1$ in only one angular position, since otherwise the pins 13 will not be received in the depressions 11. If the pins 13 and the depressions 11 were located along the same straight line which pass through the axis of the cylindrical cassette B, then it would be possible to connect the cassette to the magazine housing in two different positions, but this undesirable result is avoided by locating the pins 13 and the depressions 11 which receive the same at angular positions with respect to each other which are different from 180°. In addition, it is possible to locate each pin 13 and the depression 11 which cooperates therewith at a different distance from the central axis of the cassette B than the other pin and depression, so that in this way also connection of the cassette to the magazine housing in only one predetermined position is guaranteed. Thus, the location of the pins 13 and depressions 11 with respect to the central axis of the cassette B provide a connecting means for connecting the cassette to the magazine housing in only one predetermined position relative thereto.

In much the same way, the bottom wall 1 of the magazine housing $A_1$ is provided in the chamber 4 with a pair of depressions 14 which are adapted to receive pins 15 which are fixed to that face of the take-up magazine C which is directed toward the bottom wall 1 of the magazine housing $A_1$, and radial lines extending from the axis of the shaft 9 or the central axis of the cylindrical cassette C and passing through the axes of the depressions 14, respectively, or the axes of the pins 15, respectively, will make with each other an angle on the order to 170°, and since this angle also is different from 180° it is again impossible to connect the take-up cassette C to the magazine housing $A_1$ except in one predetermined position relative thereto. Here again, it is possible to locate one of the pins 15 and the depression 14 cooperating therewith at a different radial distance from the shaft 9 or the coinciding axis of the cassette C than the other pin 15 and cooperating depression 14, so that in this way also the operator is compelled to connect the cassette C to the magazine housing in only one predetermined position. It will be noted that the angle included between the radial lines passing through the pins 15 and the axis of the cassette C, namely 170° in the above example, is different from the angle between the radial lines passing through the pins 13 and the axis of the supply cassette B, this latter angle being 160°, in the above example, and in addition when the pins and cooperating depressions are located from these axes by different distances, the distances by which the pins and depressions cooperating with the supply cassette B are located from the axis thereof are different from those distances by which the cooperating pins and depressions of the take-up cassette C are located from the axis of the latter, so that as a result it is not possible to connect the cassette C to the magazine housing $A_1$ in the chamber 3 which is intended to receive the supply cassette B, and at the same time it is not possible to connect the supply cassette B to the magazine housing $A_1$ in the chamber 4 which is intended only to receive the take-up cassette C. Moreover, it will be noted that the pin 12 of course prevents the shaft 9 from entering into the supply cassette, so that in this way also the operator is prevented from locating the supply cassette B in the chamber 4 of the magazine.

Figure 2:
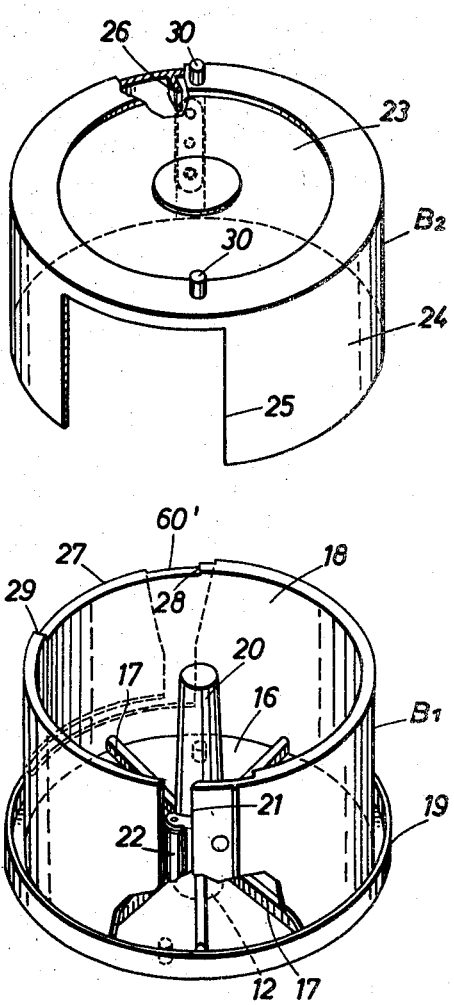
FIG. 2 is an exploded perspective illustration of a supply magazine of the invention, part of the structure being broken away and shown in section in order to illustrate the details of the cassette of FIG. 2.

Referring now to FIG. 2 which shows the details of the supply cassette B, it will be seen that this supply cassette includes a substantially cylindrical container $B_1$ and a substantially cylindrical cover $B_2$ therefor. Both of these elements are substantially cup-shaped in that they have a cylindrical side wall which is closed at only one end. The container $B_1$ has a flat bottom wall 16 which is stiffened by radial interior ribs 17, and this flat bottom wall 16 is integrally connected with the cylindrical side wall 18 which is spaced inwardly from the outer periphery of the bottom wall 16. A circular flange 19 extends upwardly from and is formed integrally with the periphery of the bottom wall 16, and this flange forms with the side wall 18 an annular space which is adapted to receive the bottom edge portion of the cover $B_2$. Moreover, there is formed integrally with the bottom wall 16 the above-described central projection 12 at the exterior of the cassette, as well as the exterior pins 13, and in addition there is formed integrally with the bottom wall 16 in the interior of the container $B_1$ a central pin 20 which extends along the axis of the cylindrical cassette B, in the manner shown in FIG. 2. The cylindrical side wall 18 is formed with a discharge slot 21 which extends parallel to the axis of the cylindrical wall 18 and through which the unexposed film issues from the interior of the supply cassette, and the side wall 18 carries in the interior of the container $B_1$ on a suitable bracket a roller 22 whose axis extends parallel to the axis of the cylindrical wall 18, this roller 22 being aligned with the slot 21 and being engaged by the film just before the film passes through the slot 21 so that the roller 22 serves to guide the film for movement with a minmium amount of friction through the slot 21.

Figure 3:
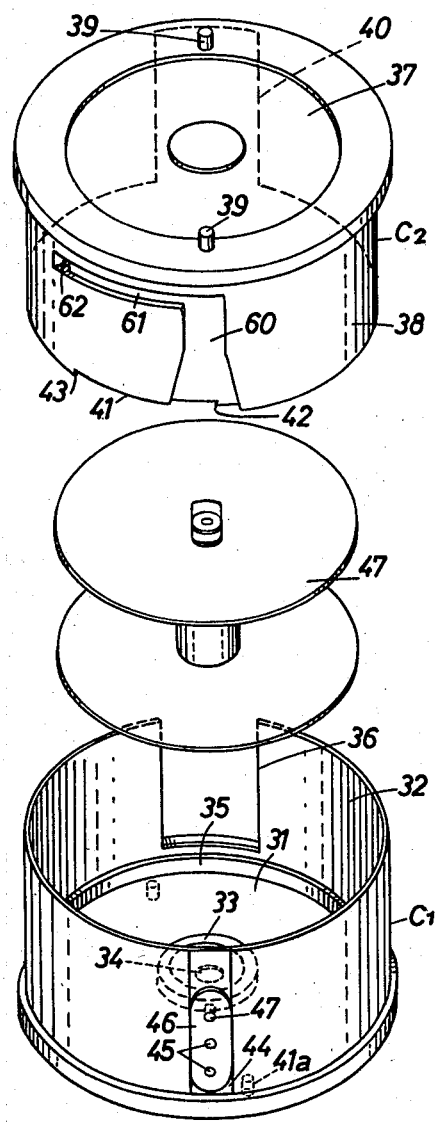
FIG. 3 is a perspective exploded view of a take-up cassette according to the invention, FIG. 3 also showing a film spool which is adapted to be located within the take-up cassette.

The cover $B_2$ is formed with a substantially flat top wall 23 which is integrally connected at its outer periphery with the cylindrical side wall 24 which is formed with the notch 25 through which the film moves after moving through the slot 21, this notch 25 being wider than the slot 21, as is apparent from FIG. 2. When the cover $B_2$ is placed on the container $B_1$, the lower free edge of the side wall 24 of the cover is received in the space between the flange 19 and the side wall 18 of the container $B_1$, as pointed out above. A bayonet means, which is described below in connection with FIG. 3, is carried in part by the container $B_1$ and in part by the cover $B_2$ in order to guide the cover for movement with respect to the container $B_1$ in a predetermined position with respect thereto in order not only to guide the cover but also to hold the latter releasably locked to the container $B_1$ as will be apparent from the description below. The top wall 23 of the cover $B_2$ is integrally formed with a projection 26 located next to the side wall 24 and received in a notch 27 formed in the upper edge of the side wall 18, this notch 27 terminating in the end faces 28 and 29, so that when the cover $B_2$ is on the container $B_1$ with the projection 26 in the notch 27, turning of the cover with respect to the container is limited by engagement of the projection 26 with the end faces 28 and 29 of the notch 27, and in this way turning of the cover with respect to the container in order to actuate the bayonet means, described below, is limited.

The unexposed film which is placed into the container $B_1$ is in the form of a coil which is not supported on a spool and which receives the central pin 20. Thus, the central pin 20 serves to centrally locate the supply of unsupported film within the supply cassette B. When the cover $B_2$ has the illustrated angular position with respect to the container $B_1$, this cover $B_2$ may be moved downwardly on to the container $B_1$, after a leading elongated end portion of the unexposed film has been drawn through the slot 21 so as to extend to the exterior of the supply cassette. It will be noted that when the cover $B_2$ is placed on the container $B_1$ in this manner, the leading end of the film will also extend through the notch 25. After the cover $B_2$ has been placed on the container $B_1$ in this manner, the cover $B_2$ is turned in a counterclockwise direction, as viewed in FIG. 2, until the projection 26 engages the end 29 of the notch 27, and in this position the notch 25 is angularly displaced with respect to the slot 21 so that the elongated leading end portion of the film which projects from the supply cassette is tightly clamped between the walls 18 and 24, and in this way light cannot enter into the supply cassette so as to undesirably expose the unexposed film therein. These latter operations of course take place in a darkroom. After the supply cassette is located in the magazine housing $A_1$, and after the latter is thereupon closed by the housing cover $A_2$, it is possible in the manner described below, to turn the cover $B_2$ relative to the container $B_1$ in a clockwise direction, as viewed in FIG. 2, by way of a structure which cooperates with the pins 30 which are fixed to and project from the wall 23 of the cover $B_2$, so that in this way after the magazine has been closed the supply cassette can have the notch 25 again aligned with the slot 21 so as to place the supply cassette in an operating position in which the film can be withdrawn therefrom in order to be exposed in the camera.

The take-up cassette which is shown in FIG. 3 also includes a container $C_1$ and a cover $C_2$, both of which are substantially cylindrical and substantially cup-shaped, as is apparent from FIG. 3. The container $C_1$ has a flat bottom wall 31 and a cylindrical side wall 32 formed integrally therewith, and the central portion of the flat bottom wall 31 carries a circular stiffening rib 33 whose center is in the axis of the cylindrical take-up cassette C. At its central portion the wall 31 is formed with an opening 34 through which the drive shaft 9 is adapted to extend. The wall 31 also has formed integrally therewith a circular flange 35 which is spaced inwardly from the wall 32 so as to form an annular space therewith. The cylindrical wall 32 is formed with the elongated axial notch 36 through which film enters into the take-up cassette after the film has been exposed.

The cover $C_2$ has a flat, or substantially flat, top wall 37 and a cylindrical side wall 38 formed integrally therewith. The pair of pins 39 which are fixed to an extent upwardly from the top wall 37 correspond to the pins 30 of FIG. 2 and are actuated by a structure described below for opening the cassette after it has been placed in the magazine housing and after the latter has been closed. The cylindrical side wall 38 of the cover $C_2$ is formed with an elongated axial notch 40 which is aligned with the notch 36 so that the film can pass through the aligned notches 40 and 36 into the take-up cassette C, and also the cover $C_2$ can be turned, in a manner described below, with respect to the container $C_1$ to a position where the notch 40 is displaced from the notch 36 so that the take-up cassette is closed. When the cover $C_2$ is placed on the container $C_1$ the bottom free edge of the cylindrical side wall 38 of the cover $C_2$ enters into the space between the side wall 32 and the flange 35 of the container $C_1$, the side wall 38 of the cover in the case of the take-up cassette being surrounded by the side wall 32 of the container $C_1$. In the case of the take-up cassette, it is the free edge of the side wall 38 of the cover which is formed with a notch 41 corresponding to the notch 27 of the supply cassette, and the ends 42 and 43 of the notch 41 cooperate with a projection 41a in the interior of the container $C_1$, in the space between the side wall 32 and the flange 35, to limit turning of the cover with respect to the container.

The cylindrical side wall 32 of the container $C_1$ is formed in its exterior with an axial groove 44 in which a leaf spring 46 is fixed by a pair of rivets 45, and the upper end of the leaf spring 46 fixedly carries a pin 47 which extends through an opening in the side wall 32 into the interior of the space surrounded by the side wall 32. This spring-pressed pin 47 forms part of a bayonet means, this particular part being carried by the container $C_1$. The side wall 38 of the cover $C_2$ carries the remainder of the bayonet means which is in the form of a groove formed in the exterior of the side wall 38, this groove having the axial portion 60 which receives the pin 47 and which is widened at its lower end portion, as shown in FIG. 3, so that in this way the axial groove portion 60 of the bayonet means can easily move downwardly with respect to the pin 47 to receive the latter, and of course the groove portion 60 cooperates with the pin 47 to compel the cover $C_2$ to be placed on the container $C_1$ only when the cover has a predetermined angular position with respect to the container $C_1$. When the cover $C_2$ has been placed all the way on the container $C_1$ so that the bottom edge of the side wall 38 is in the space between the flange 35 and the side wall 32, the projection 41a which is integral with the container $C_1$ will be in the notch 41 adjacent to the end 42 thereof, and at this time the pin 47 will be at the elevation of the groove portion 61 which extends to the left, as viewed in FIG. 3, from the upper end of the groove portion 60. Thus, after the cover $C_2$ has been located on the container $C_1$ in the manner described above, it is possible for the operator to turn the cover $C_2$ in a counterclockwise direction, as viewed in FIG. 3, relative to the container $C_1$ so as to advance the groove portion 61 of the bayonet means to the right, as viewed in FIG. 3, with respect to the pin 47, and this turning of the cover relative to the container of the cassette C can continue until the end 43 of the notch 41 reaches the projection 41a. In this latter position, the notch 40 will have been displaced so that it is out of line with the notch 36, and the exposed film within the take-up cassette C will be tightly pinched between the walls 32 and 38 at the free end portion of the film which extends through the notches 36 and 40, so that in this way the cassette C is closed in a light-tight manner and can be removed with the exposed film from the magazine in order to be sent to have the exposed film developed. At the end of the groove portion 61 the wall 38 is formed with a depression 62 deeper than the groove portion 61 into which the pin 47 snaps when the end 43 of the notch 41 engages the projection 41a, so that in this way the bayonet means serves to releasably lock the cover $C_2$ to the container $C_1$ with the notch 40 displaced beyond the notch 36, and the force required to displace the pin 47 out of the depression 62 is great enough to guarantee that the container $C_1$ will turn with the cover $C_2$ except under conditions described below. Thus, when the take-up cassette C is inserted into the chamber 4 of the magazine housing $A_1$, with the cover and container of the cassette C releasably locked in the manner described above, the cassette can be turned by actuation of the pins 39 in a manner described below in such a way that the container $C_1$ will necessarily turn with the cover $C_2$ until the pins 15 are located in the depressions 14, and it is not possible at this time for the cover to turn relative to the container, so that the cassette remains reliably closed until the pins 15 are aligned with and received in the depressions 14. Thereafter, in a manner described below, when the cover is turned the pins 15 will be held in the depressions 14 so that the container cannot turn and at this time the spring pressed pin will be displaced from the depression 62 and it will be possible to open the cassette in a manner described below.

The above-described bayonet means shown in FIG. 3 is also included in the supply cassette of FIG. 2. In other words, the supply cassette of FIG. 2 has a bayonet means constructed in the same way as the bayonet means of FIG. 3. However, in the case of FIG. 2, it is the side wall 24 of the cover $B_2$ which carries in a groove at its exterior, at the side of the cover which is not visible in FIG. 2, the spring pressed pin which extends through an opening of the side wall 24, and this pin is received in a bayonet groove 60' formed in the exterior of the side wall 18 of the container $B_1$. In this case the axial portion of the groove extends downwardly from the top edge of the side wall 18, and adjacent to the lower part of the side wall 18 is located the horizontal portion of the bayonet groove so that after the cover $B_2$ is placed on the container $B_1$ with the projection 26 adjacent to the end 28 of the notch 27, the cover can be turned in a counter-clockwise direction, as viewed in FIG. 2, to displace the spring-pressed pin of the bayonet means along the horizontal part of the bayonet groove until, when the projection 26 reaches the end 29 of the notch 27, this spring-pressed pin will be received in a deeper depression at the end of the horizontal part of the bayonet groove, so that in this way the bayonet means of FIG. 2 also locks the cover $B_2$ to the container $B_1$ releasably in a position where the notch 25 is displaced relative to the slot 21, as described above, and thus the container will remain fixed to the cover while the operator turns the supply cassette B in the chamber 3 in order to locate the pins 13 in alignment with the recesses 11 so as to enter into the latter, and thereafter a structure described below cooperates with the pins 30 for turning the cover relative to the container of the supply cassette B in order to place the opening 25 of the cover in alignment with the slot 21 so that the film can issue from the supply cassette B.

A conventional, two-piece spool 47 is located in the take-up cassette to have the exposed film wound thereon, and when the take-up cassette C is placed in the chamber 4 of the magazine housing, the shaft 9 extends through the opening 34 in the wall 31 and into the central bore of the core of the spool 47 to receive in the transverse slit of the shaft 9 a transverse rib in the bore of the core of the spool 47, as is conventional, so that in this way the spool 47 is placed in driving engagement with the shaft 9. It will be noted that the spool 47 cannot by mistake be located in the supply cassette B since this latter cassette is provided in its interior with the central pin 20 which prevents a spool from being located within the supply cassette. Even if a pin 20 is not provided, the dimensions of the interior space of cassette B can be such that it will not be capable of receiving the spool 47. For example, when the cover $B_2$ is placed on the container $B_1$, the ribs 17 are located so close to the wall 23 that the spool 47 cannot be located, even in a supply cassette which does not have a pin 20, in the supply cassette and at the same time permit the cover $B_2$ to be moved onto the container $B_1$ through the distance required to place the free edge of the wall 24 all the way into the space between the flange 19 and the wall 18 as well as to place the stop 26 in the notch 27, so that in this way also it is possible to prevent the spool from erroneously being located within the supply cassette, although the construction of FIG. 2 is preferred since the pin 20 provides a very positive structure for preventing the spool from being located in the supply cassette, and thus it is possible in the dark to prevent any errors from being made. Moreover, as was pointed out above, the operator can in the dark easily feel the opening 34 and the pin 12 so as to readily distinguish between the take-up cassette and the supply cassette. Both of these cassettes are preferably made of a plastic material such as polycarbonate or a suitable polyamide. Moreover, the diameter of the annular space between the flange 19 and the wall 18, and thus the diameter of the side wall 24, is different from the diameter of the annular space between the flange 35 and the wall 32, and thus the diameter of the wall 38, so that in this way also it is not possible in the darkroom for the operator to place the cover $C_2$ of the take-up cassette on the container $B_1$ of the supply cassette, or the cover $B_2$ of the supply cassette on the container $C_1$ of the take-up cassette.

When a fresh supply of unexposed film has been placed in the supply cassette and the latter has been closed in the manner described above, all of the remaining operations can take place out of the darkroom, although even if they are continued in the darkroom no confustion can result between the several parts, as described above, and even if parts of the take-up cassette should be in the vicinity of the parts of the supply cassette in the darkroom, the operator cannot make any errors. The take-up cassette is constructed so that it can be closed before it is removed from the magazine so that the exposed film in the take-up cassette will not be exposed to light before the film is properly developed. Thus, with a suitable length of film extended from the closed supply cassette B, after the latter has been loaded in the darkroom as described above and after the cassette has been closed in the manner described above, this cassette B is placed in the chamber 3 and it is turned therein until the pins 13 are received in the recesses or depressions 11 in the manner described above, and even though the cover of the supply cassette is turned at this time the container of the supply cassette will turn therewith because of the bayonet means described above. When the pins 13 enter into the depressions 11 the projection 12 will of course move further into the depression 10 and the operator will feel the entire supply cassette move all the way into the chamber 1 so that he knows that it is properly located in the magazine housing, and the leading elongated end portion of the film, which projects from the cassette B will extend through the slit 6. The operator will connect the free end of the film to the spool 47 in a purely conventional manner, for example through a suitable clip which is carried by the core of the spool 47, and then this spool is placed in the container $C_1$ and the cover $C_2$ is placed over the container and closed in the manner described above through the bayonet means, and then the take-up cassette C is placed in the chamber 4 with the film passing through the slit 7, and the take-up cassette is now turned until the pins 15 are received in the depressions 14, the shaft 9 automatically having a driving engagement with the spool 47 in the manner described above.

Figure 1A:
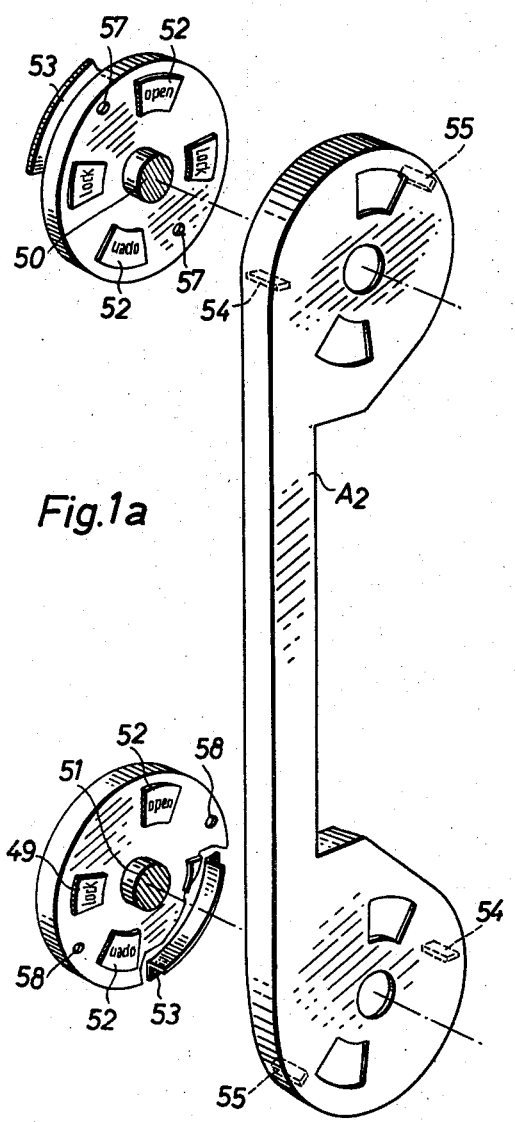
FIG. 1a is an exploded perspective illustration of the cover assembly shown in FIG. 1.

With the cassettes thus properly positioned in the magazine housing $A_1$, the cover $A_2$ can be placed on the housing $A_1$. The cover $A_2$ turnably carries a pair of discs 48 and 49 (FIGS. 1 and 1a) which are fixed to shafts 50 and 51 which extend through suitable openings of the cover $A_2$ so that these openings form bearings for the shafts 50 and 51 and in this way the shafts 50 and 51 together with the discs 48 and 49 are turnably supported by the cover $A_2$ of the magazine housing $A_1$, and at the exterior of the cover $A_2$ suitable knobs or keys are respectively fixed to the shaft 50 and 51 so that the operator can turn these shafts and the discs 48 and 49 therewith. The disc 48 fixedly carries an arcuate flange portion 53 which projects from the periphery of the disc 48 and which can turn between the stationary stop members 54 and 55 carried by the cover $A_2$. A pair of portions of the face of the disc 48 which is directed away from the cassette B are provided with the printed indications OPEN, and a pair of other portions of this face of the disc 48 are provided with the designations Closed. In one end position where the flange 53 engages one of the stops 54 and 55 the designation Open will appear in windows 52 formed in the cover 82, while in the other end position the designations Closed will appear in the windows 52. The magazine housing $A_1$ fixedly carries a projection 56 behind which the flange 53 turns when the operator turns the shaft 50 and the disc 48 in a clockwise direction, as viewed in FIG. 1, and by passing behind the projection 56 the flange 53 locks the cover A₂ on the housing A₁. In the position illustrated in FIG. 1, the designation OPEN will appear in the windows 52, and when the operator turns the disc 48 in a clockwise direction, as viewed in FIG. 1, to locate the flange 53 in engagement with the stop 55, the designation Lock will appear in the windows 52. It will be noted that the flange 53 cannot turn behind the projection 56 unless the cover A₂ has been securely mounted on the housing A₁. It is thus necessary for the cover A₂ to be placed all the way on the magazine housing A₁ before the magazine can be closed, and in addition it is necessary that the disc 48 initially have an angular position where the flange 53 engages the stop 54 and where the designations Open appear in the windows 52. As was indicated above, the pins 13 cooperate with the depressions 11 in order to locate the cassette B in a predetermined angular position in the housing A₁. Moreover, the above-described bayonet means guarantees that the cover of the supply cassette B has a predetermined angular position with respect to the container thereof, when the supply cassette is closed, as it is when it is placed in the magazine. Therefore, the pins 30 will necessarily have predetermined angular positions, and when the flange 53 engages the stop 54 of the cover A₂, depressions 57 of the disc 48 are aligned with and will receive the pins 30. Thus, it is only in the angular position of the disc 48 where the flange 53 can move past the projection 56 that the depressions or openings 57 are aligned with the pins 30 so as to receive the latter. Thus, when the disc 48 is turned in a clockwise direction, after the cover A₂ has been placed on the housing A₁, not only will the magazine be locked in its closed position, but in addition the cover of the cassette B will be turned relative to the container thereof so as to align the notch 25 with the slot 21 and thus release the film for movement out of the supply cassette. The disc 49 has a peripheral flange 53 (FIG. 1a) identical with the flange 53 of disc 48 and cooperating with the lower pin 56 of the housing A₁, as viewed in FIG. 1, so that turning of the disc 49 in a clockwise direction, as viewed in FIG. 1, will also lock the cover to the magazine housing at the region of the chamber 4, and in this case also it is necessary to locate the designations OPEN in the lower windows 52 of FIG. 1 in order to place the disc 49 in an angular position where its flange will move past the lower pin 56 of FIG. 1, and in this angular position a pair of openings or depressions 58 of the disc 49 are respectively aligned with the pins 39 to receive the latter, so that in this case also when the operator turns the disc 49 to the position which will locate the designations Lock in the windows 52 at the lower part of the cover shown in FIG. 1 not only will the magazine cover be locked to the housing at the region of the chamber 4, but in addition the cover of the take-up cassette will be turned relative to the container of the take-up cassette to align the notch 40 with the notch 36 so that film can now freely move into the take-up cassette.

The magazine has now been placed in the position where the film can be exposed in the camera, and after the length of film has been fully exposed it will be noted that the operator has to return the discs 48 and 49 to their open positions in order to remove the cover from the magazine housing. The necessity of turning the discs 48 and 49 to their open positions before the cover A₂ of the magazine can be removed, automatically locates the covers of the cassettes in their closed positions, and since the cover of the take-up cassette is placed in this way in its closed position where the notch 40 is out of line with the notch 36, the exposed film within the take-up cassette cannot be exposed to light when the cover of the magazine is removed, and the operator may now simply remove the take-up cassette with the exposed film therein to send this cassette to a place where the film therein will be developed. Thereafter, the operator can place a fresh supply of film in the supply cassette and connect the free end of the film to another spool in another take-up cassette identical with that described above and placed in the magazine in the manner described above, so that the operations can then continue.

It will be understood that each of the elements described above, or two or more together, may also find a useful application in other types of cameras differing from the types described above.

While the invention has been illustrated and described as embodied in camera magazine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a film magazine for cameras, in combination, a magazine housing and a film cassette adapted to be located in said housing, said cassette having a predetermined axis and said cassette when in said housing having a face which is located directly next to a face of said housing, one of said faces being formed with a pair of depressions and the other of said faces carrying a pair of pins respectively located in said depressions when said cassette is in said housing with said faces next to each other, a pair of radial lines which intersect at the axis of said cassette and extend therefrom through the axes of the cooperating pins and depressions making with each other an angle different from 180° so that the cassete can be located in the housing only in a given angular position.

2. In a film magazine for cameras, in combination, a magazine housing and a film cassette adapted to be located in said housing, said cassette having a predetermined axis and said cassette when in said housing having a face which is located directly next to a face of said housing, one of said faces being formed with a pair of depressions and the other of said faces carrying a pair of pins respectively located in said depressions when said cassette is in said housing with said faces next to each other, a pair of radial lines which intersect at the axis of said cassette and extend therefrom through the axes of the cooperating pins and depressions making with each other an angle different from 180° so that the cassette can be located in the housing only in a given angular position, one of said pins and the depression which receives said pin when said cassette is located in said housing being located nearer to said axis than the other of said pins and the depression which receives the same.

3. A film magazine for cameras, comprising, in combination, a magazine housing; and a pair of cassettes adapted to be located in said housing with a pair of faces of said cassettes respectively located next to a pair of faces of said housing so as to provide two pairs of faces with the faces of each pair located next to each other, one of each pair of faces being formed with a pair of depressions and the other of each pair of faces carrying a pair of pins located in said depressions when said cassettes are in said housing, said cassettes being respectively adapted to carry exposed and unexposed film and each having a predetermined axis, the cooperating pins and depressions being located along radial lines which respectively extend from said axes and the radial lines of each pair of faces making an angle different from 180° with the angle made by the radial lines at one of said pair of faces being different from the angle made between the pair of radial lines at the other of the pair of faces, so that the pair of cassettes can be located in said housing only in predetermined angular positions and so that the pair of cassettes cannot interchangeably be located at said faces of said housing.

4. In a film magazine, for cameras, in combination, a magazine housing and a cassette adapted to contain film and adapted to locate it in said housing with a face portion of said housing located directly next to a face portion of said cassette, said cassette including a substantially cylindrical container and a substantially cylindrical cover therefor and bayonet means carried in part by said container and in part by said cover for locating said cover in a predetermined position with respect to said container when the cassette is closed and for releasably preventing opening of the cassette, said cassette and said magazine carrying at said face portions thereof means which locates said cassette in a predetermined angular position with respect to said housing, whereby when the container and cover of said cassette are releasably locked to each other by said bayonet means said cover may be turned together with said container to provide proper location of said cassette in said housing through said locating means at said face portions.

5. A film magazine for cameras, comprising, in combination, a magazine housing and a pair of film cassettes adapted to be located therein, one of said cassettes being a supply cassette for containing unexposed film and the other of said cassettes being a take-up cassette for receiving exposed film, and only said take-up cassette having therein a spool for receiving the film, said supply cassette containing film without a spool, said supply cassette having in its interior a stationary pin around which the film in said supply cassette is adapted to be coiled, and said stationary pin preventing a film spool from being placed within said supply cassette.

References Cited in the file of this patent
UNITED STATES PATENTS

| | | |
|---|---|---|
| 999,679 | Selig | Aug. 1, 1911 |
| 2,423,663 | Roehl | July 8, 1947 |
| 2,983,462 | Berlings | May 9, 1961 |

FOREIGN PATENTS

| | | |
|---|---|---|
| 664,223 | Great Britain | Jan. 2, 1952 |